April 5, 1960     R. S. DU FRESNE     2,931,751

TILE AND METHOD OF SEALING AND MOUNTING

Filed May 17, 1955

INVENTOR.
Robert S. DuFresne
BY
Attorney.

United States Patent Office 2,931,751
Patented Apr. 5, 1960

2,931,751

TILE AND METHOD OF SEALING AND MOUNTING

Robert S. Du Fresne, La Crescenta, Calif., assignor to Gladding, McBean & Co., Los Angeles, Calif., a corporation of California Application May 17, 1955, Serial No. 508,884

10 Claims. (Cl. 154—118)

This invention relates to methods of treating ceramic tile, such as wall and floor tile, and to improved forms of ceramic tile.

Ceramic tile comprise a finely porous body made of clay, talc, grog, silica, minerals and substances capable of incipient fusion at the temperatures at which such bodies are burned to maturity, and various other mixtures normally employed in ceramic compositions. This body portion is finely porous and normally has an absorption of about 6 to 10% by weight and in most instances in excess of about 4% by weight, although certain forms of so-called vitreous tile have a somewhat lower absorption. The usual wall and floor tile, however, have the finely porous ceramic body which is exposed on the posterior surface, the frontal surface being provided with a suitable impervious glaze which tenaciously adheres to the body.

Most tile of the stated type are laid in a bed of mortar, mastic or bonding cement which is in contact with the unglazed posterior surface of the tile. In recent years mastics or bonding cements have been mostly commonly employed and although a suitable bond is formed between the tile and the structural support by the bonding cement, staining or discoloration of the tile becomes apparent in many instances shortly after the tile has been installed on the walls of a bathroom, kitchen, shower stall or the like. It has been discovered that this staining or discoloration is apparently due to the impregnation of the finely porous body of the tile with liquids carrying coloring matters and particles of bonding cement, these particles and coloring matters becoming visible through the impervious glaze carried by the frontal surface of the tile. As a result many installations of tile become unattractive and distasteful due to the staining or bleeding referred to.

This invention is directed to a method of inhibiting, retarding and obviating the staining, bleeding and discoloration of tile set or bonded with mastic cements, rubber cements and other bonding compositions, without impairing an adequate and proper bond between the tile and the structure to which it is affixed.

Moreover, the invention contemplates methods of treating ceramic wall and floor tile whereby non-bleeding tile can be supplied in the form of panels, each panel being provided with a plurality of tile in suitably oriented and spaced relation, the entire panel being capable of being applied to a wall or floor surface at one time, thereby greatly expediting the installation of tile and insuring uniform aligned spacing between tile.

It is an object of the present invention therefore to disclose and provide methods of treating tile so as to inhibit subsequent penetration of the body of the tile with color-bearing liquid agents which normally cause visible discoloration.

Another object of the invention is to provide an improved ceramic tile comprising a finely porous body portion of a frontal surface covered with impervious glaze, the body portion being treated to resist penetration thereof with color-bearing liquids.

A still further object of the invention is to disclose and provide a method of treating and preparing ceramic wall and floor tile whereby panels thereof may be readily installed.

These and various other objects, uses and advantages of the invention will become apparent from the following description of forms of apparatus capable of being used in the performance of the method and of the products resulting therefrom, illustrated in the appended drawings, in which Fig. 1 is an enlarged perspective view of a corner portion of a ceramic tile;

Figure 1:
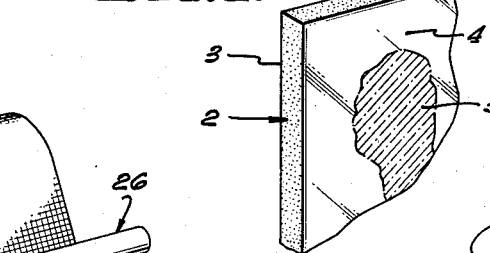

The ceramic tile particularly adapted to the treatment of the present invention comprise a body portion 2 made of suitable burned ceramic composition, such body portion having an absorption characteristic in excess of 4%. Floor and wall tile may vary in thickness and size but also always include a rear or posterior face 3 which is generally matte in appearance and capable of rapidly absorbing liquids, and a frontal surface 4 provided with a tenaciously adhering glaze composition of suitable coloring and ornamentation. The glaze composition is generally translucent; in some instances it is substantially transparent although colored; in other instances, it may be substantially opaque. When such tile are bonded to a supporting surface by the use of normal bonding agents, cements or mastics, the liquids contained in the bonding agents are rapidly absorbed by the body portion 2. In most instances the bond agents or cements contain liquids of high vapor pressure and such liquids contain coloring matters derived from the bonding agent. The coloring substances carried by the liquids appear to be deposited beneath the lower surface of the frontal glaze 4 and after some period of time has elapsed blotches of discoloring nature are visible through the glaze 4, particularly if such glaze is of a transparent or translucent character. One such blotch is illustrated in light dash lines as indicated at 5 in Fig. 1. An installation so discolored and blotched is of course unsatisfactory.

It has been found that when the rear surfaces of tile are sprayed with a dispersion of a synthetic resin, the dispersion being in the form of particles of resin having an average dimension of not over about two microns, the resin particles impregnate the body 2 adjacent the postereior surface 3 and prevent, inhibit or retard the subsequent impregnation of the tile body with coloring matters carried by liquids of high vapor pressure. This desirable result is obtained without destroying the roughened, matte and finely pitted character of the rear surface 3 and its ability to thoroughly bond with the bonding agents, cements and mortars normally employed in setting tile.

Although various dispersions of different resins may be used, best results have been observed by the use of a dispersion of a vinyl copolymer or a copolymer of vinyl chloride and vinyl acetate. Vinylidenechloride, other aliphatic vinyl type resins, polyamide dispersions and acrylic resins may be used. A vinyl acetate copolymer emulsion or dispersion capable of being diluted with water and containing a plasticizer, which appears to permit the resin particles to more readily wet the ceramic porous body, has been found to be a preferred material. In all instances the resin particles in the dispersion preferably have an average dimension not over two microns. The resin should be colorless or white, preferably carry a negative particle charge and be capable of being cured rapidly at a relatively low temperature. The dispersions used as a spray on the rear surfaces of the tile may carry from 20 to 40% of total solids by weight. The quantity of such dispersion applied to the rear surfaces of the tile should be sufficient to impregnate the body 2 adjacent the rear surface 3 and inhibit subsequent penetration of the body with liquids of high vapor pressure without the formation of a continuous surface film on the rear surface 3. In actual practice it has been found that one gallon of the preferred dispersion is sufficient to treat approximately 1700 square feet of tile.

After being sprayed the tile may be subjected to a rapid curing either in air or under the influence of infra-red heat sources.

Figure 2:
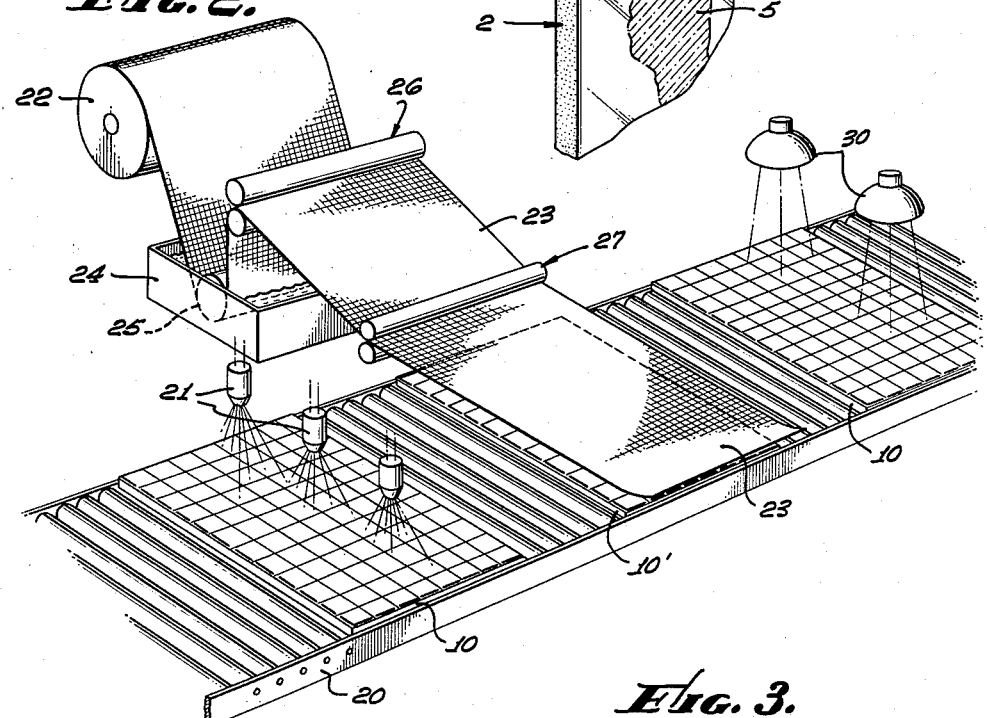
Fig. 2 is a somewhat diagrammatic perspective representation of apparatus which may be utilized in the treatment of tile in accordance with the present invention.
Figure 3:
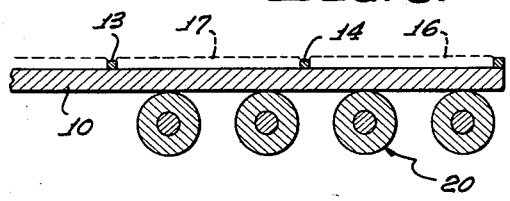
Fig. 3 is an enlarged view in section of a portion of platen used in Fig. 2.
Figure 4:
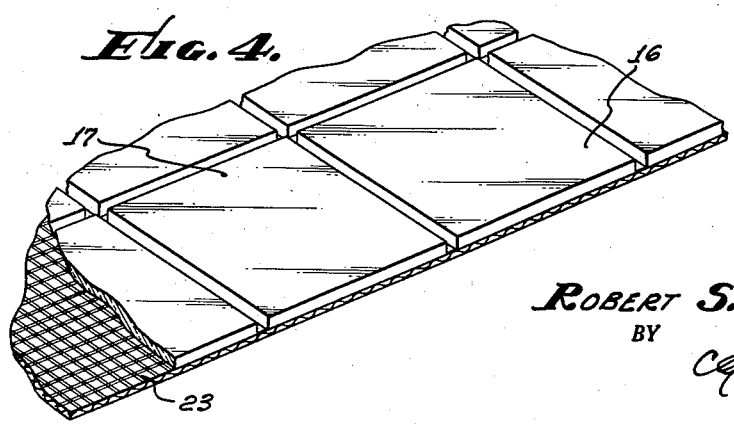
Fig. 4 is an enlarged perspective view of a portion of a panel including the treated tile.

Although the tile treated in the manner described hereinabove may be sold as individual tile for installation in the normal rather laborious fashion, full advantage of the present invention is attained by panelizing the treated tile so as to produce a large sheet carrying a plurality of tile in predetermined spaced relation so that the entire sheet may be installed as a unit. In the attainment of this result an arrangement such as is illustrated in Fig. 2 may be used. As there shown a pallet or other suitable flat support 10 is provided with narrow spacing strips 13, 14 and the like arranged both laterally and longitudinally in spaced relation so as to form intervening spaces capable of snugly receiving tile such as the tile 16, 17 and the like. The tile 16, 17 are placed with the anterior face uppermost and glazed surface down. The spacing strips 13 and 14 are of a width equivalent to the thickness of the normal joint desired in a wall or floor between said tile. The entire pallet 10 may be 2 to 4 feet wide and 4 to 8 feet long. It may be mounted upon a roller conveyor 20 for rapid movement from a loading zone or station to a spray station, at which time a suitable finely divided spray of the desired resin emulsion is applied to the upwardly directed anterior faces of the arrangement of tile carried by the platen 10. Such spray means are indicated at 21 in Fig. 2.

Thereafter the platen 10 may be moved to a panelizing zone or position 10'. At this zone a strip of pretreated woven open mesh fabric is applied to the plurality of pretreated tile carried by the platen 10'.

In Fig. 2 a supply roll of suitable fabric is indicated at 22, the fabric 23 then passing through a bath 24 of a suitable resin, a dipping roller being indicated at 25, wringer rollers at 26 and pressure feeding rollers at 27.

As previously indicated, the fabric 23 is a woven fabric of open mesh. The openings should have a minimum dimension of not less than 3/16" and not greater than about 1/2". The fabric can be made of metal, sisal fiber, cotton, glass thread or yarn and any other matereial which is virtually non-elastic and is compliant but will not stretch. The resin employed in the bath 24 is preferably a thermoplastic resin and the bath is arranged to coat the warp and woof of the fabric 23 without the formation of a bridging film between adjacent fibers. As a result the fabric 23 discharged by the feeding rolls 27 into position above the pallet 10' is an open mesh fabric with an uncured coating of thermoplastic resin upon the warp and woof of the fabric.

The rear surfaces of the plurality of tile (treated as previously described) and positioned in predetermined relation upon the pallet or carrier 10' is now covered with a length of fabric 23 (treated in the manner stated) and such fabric is pressed or rolled against the anterior surfaces of the pretreated tiles by means of squeegee or hand rollers. The continuous length of fabric is cut so as to extend slightly beyond the parametric edges of the entire assembly of tile on carrier 10'.

The carrier 10' is then moved into a curing zone as indicated at 10" where it is subjected to a rapid curing operation as under the bank of infra-red heat sources 30. Thereafter the carrier 10' is removed from the curing zone and the entire panel of tile mounted upon the continuous, compliant but inelastic backing is folded over onto itself to form a compact unit having a plan measurement of ½ or ⅓ its original length, for shipment and ready installation.

I claim:

1. A ceramic tile product including a finely porous body portion having a natural absorption characteristic in excess of 4% by weight, said body portion having a frontal surface covered with a tenaciously adhering, impervious substantially translucent glaze and a posterior bonding surface, a zone of said body portion adjacent said posterior bonding surface having its porosities filled with a water-insoluble substantially colorless resin, whereby penetration of the body portion with color-bearing liquids and particles from bonding cements and mastics and resulting discoloration visible through said glaze is inhibited.

2. In a method of treating ceramic wall and floor tile provided with a finely porous, ceramic body having an absorption in excess of 4% and a glazed front surface, the steps of: spraying a dispersion of a vinyl polymer in the form of particles having an average dimension of not more than two microns upon the exposed, finely porous, rear body surface of ceramic wall tile in quantity insufficient to form a continuous film of said vinyl polymer but sufficient to retard penetration of liquids into said body; applying an open mesh, woven fabric having openings whose minimum dimension is not less than 3/16 in. and not greater than ½ in., the warp and woof of such fabric being coated with a thermoplastic resin and being compliant without being stretchable, to the rear, treated surface of a plurality of ceramic wall tile so treated and arranged with predetermined spaces therebetween, and then simultaneously curing the thermoplastic bond and the vinyl polymer sealant.

3. As an article of commerce, a burned ceramic tile which does not exhibit discoloration and blotches derived from coloring matters in mastics and cements in which said tile is set, comprising: a finely porous burned body portion having a natural absorption characteristic in excess of 4% by weight; a frontal surface covered with a tenaciously adhering virtually translucent impervious glaze; and a finely porous rear body surface, the pores of said body portion adjacent said rear surface being filled with a substantially colorless organic resin to prevent penetration of said body with color bearing liquids.

4. An article of commerce as stated in claim 3 wherein the organic resin is in the form of particles having an average dimension of not over two microns, and the rear surface is free from a continuous film of said resin.

5. As an article of commerce, a burned ceramic tile which does not exhibit discoloration and blotches derived from coloring matters in mastics and cements in which said tile is set, comprising: a finely porous burned body portion having a natural absorption characteristic in excess of 4% by weight, said body portion having a substantially translucent ceramic glaze tenaciously adhering to the frontal surface of said body and a finely porous rear body surface, said rear surface having a matte character for bonding with mastics and cements, the pores of said body portion adjacent said rear surface being filled with particles of a substantially colorless organic resin to prevent penetration of said body with color-bearing liquids.

6. An article of commerce as stated in claim 5, wherein said particles of organic resin are derived from an aqueous dispersion of resin particles having an average dimension of not over two microns.

7. An article of commerce comprising a plurality of ceramic tile as stated in claim 5, the rear surfaces of said plurality of tile being secured to an open mesh fabric with predetermined spacing between said plurality of tile.

8. A method of treating burned ceramic tile having a porous ceramic body, a frontal surface provided with a translucent, tenaciously adhering ceramic glaze and a finely porous, matte rear surface to prevent the formation of disfiguring blotches and discolorations visible through said glaze, comprising: applying a spray of an aqueous dispersion of substantially colorless synthetic resin in the form of particles having an average dimension of not over two microns to the rear finely porous surface of burned ceramic tile, said tile having a body having an absorption characteristic in excess of 4%, said spray being applied in quantity insufficient to form a continuous film on said rear surface and insufficient to destroy its matte character but sufficient to retard penetration of liquids containing coloring matters from mastics and cements in which said tile is set.

9. A method as stated in claim 8 including the step of arranging a plurality of tile thus treated with predetermined spacing between tile, and adhesively securing the rear surfaces of said plurality of tile to an open mesh fabric.

10. A method as stated in claim 8 including the step of arranging a plurality of tile thus treated with predetermined spacing between tile, applying to the rear surfaces of said plurality of tile an open mesh compliant fabric, the warp and woof thereof being coated with a thermoplastic resin, and securing said fabric to said rear surfaces by subjecting the assembly to the action of heat.

References Cited in the file of this patent

UNITED STATES PATENTS

| Number | Name | Date |
|---|---|---|
| 762,428 | Munro | June 14, 1904 |
| 1,609,938 | Forrest | Dec. 7, 1926 |
| 2,017,318 | McCoy | Oct. 15, 1935 |
| 2,027,435 | Kallander et al. | June 14, 1936 |
| 2,112,241 | Hyde | Mar. 29, 1938 |
| 2,265,614 | Schmohl | Dec. 9, 1941 |
| 2,308,650 | Desagnat | Jan. 19, 1943 |
| 2,391,515 | Richards et al. | Dec. 25, 1945 |
| 2,427,513 | Spessard | Sept. 16, 1947 |
| 2,470,918 | Chung | May 24, 1949 |
| 2,678,896 | Dratler | May 18, 1954 |
| 2,728,702 | Simon et al. | Dec. 27, 1955 |
| 2,733,592 | Burchenal et al. | Feb. 7, 1956 |
| 2,742,391 | Warp | Apr. 17, 1956 |
| 2,794,752 | Schmidt | June 4, 1957 |